Aug. 2, 1938.  K. SCHWÄRZLER  2,125,361
SAFETY DEVICE FOR AEROPLANES
Filed Nov. 15, 1935  2 Sheets-Sheet 1
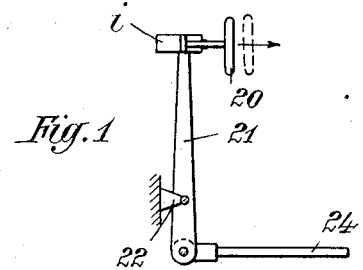
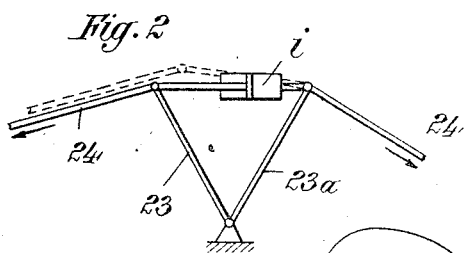
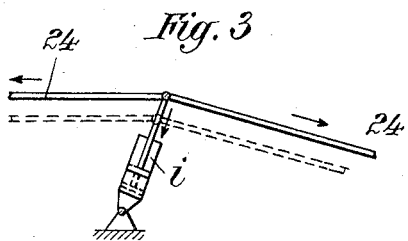
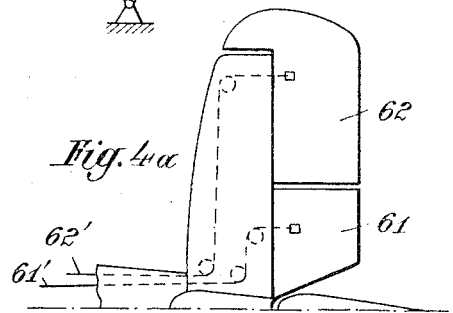
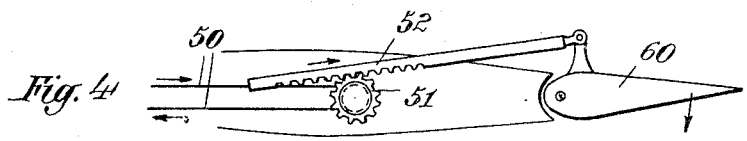
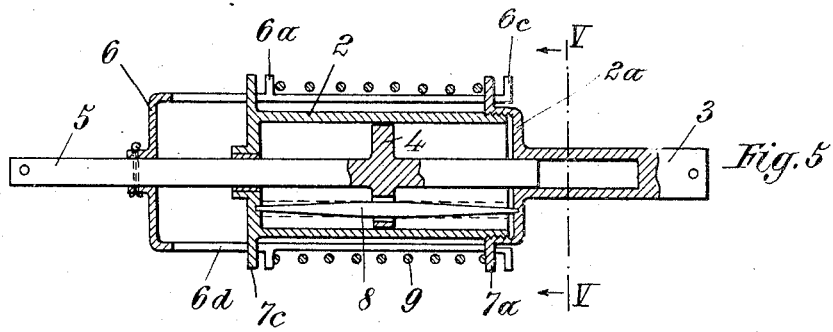
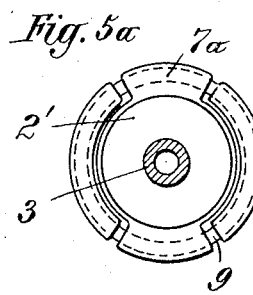
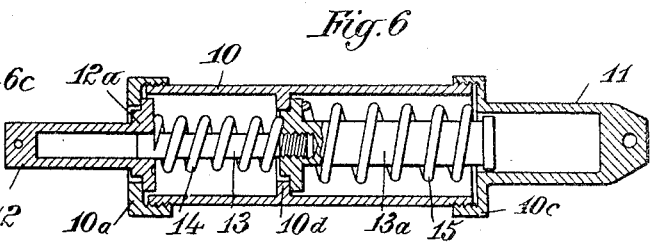
Inventor: KARL SCHWÄRZLER
by Karl Viertel.
Attorney

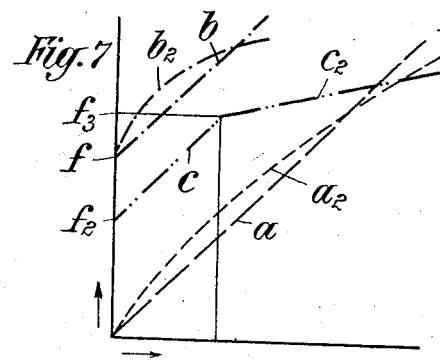
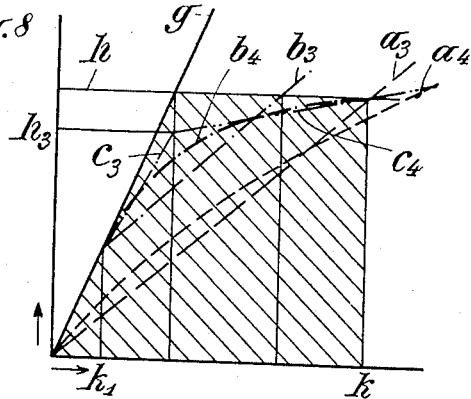
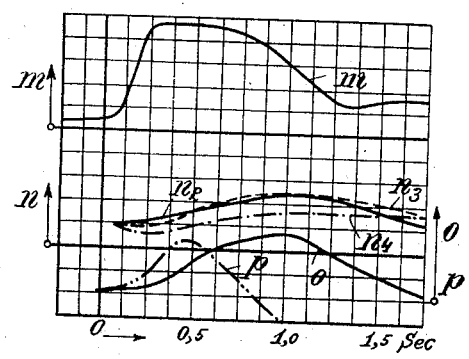
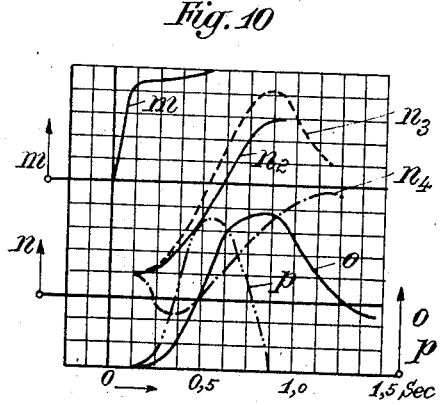
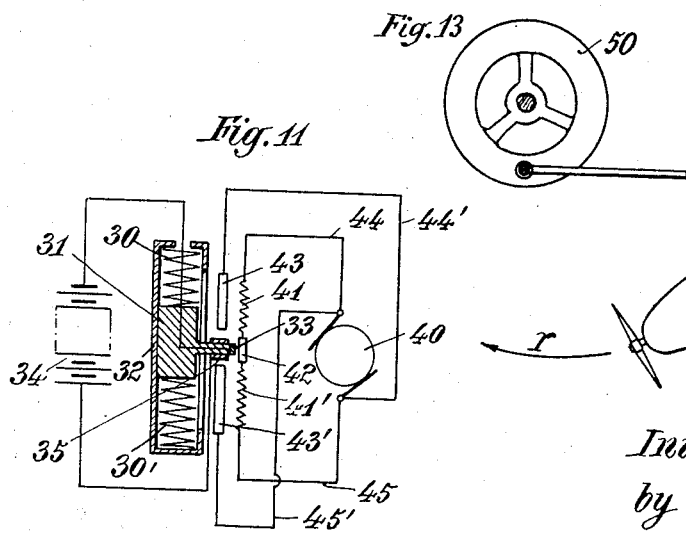
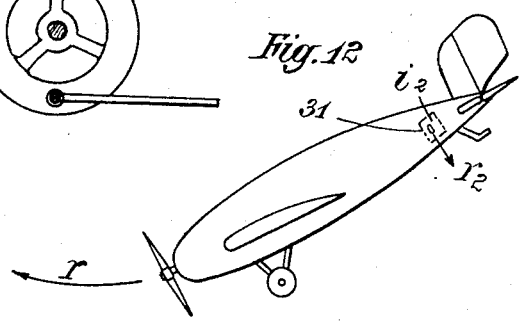

Patented Aug. 2, 1938

2,125,361

UNITED STATES PATENT OFFICE 2,125,361

SAFETY DEVICE FOR AEROPLANES

Karl Schwärzler, Warnemunde, Germany

Application November 15, 1935, Serial No. 50,016
In Germany November 17, 1934

6 Claims. (Cl. 244—87)

My invention relates to structural improvements in elevator control mechanism for aeroplanes, seaplanes and other air craft of the "heavier than air type".

As a matter of fact known to practitioners extraordinarily high and excessive stresses including bending, tensile, compression, shearing, torsional etc. stresses, resulting in breakage are apt to occur for instance whenever the aeroplane on steeply descending is righted all too rapidly or through excessively large deflections of the elevator; namely in all cases, where the angle of incidence is enlarged all too abruptly or to an excessive extent.

In times gone by, when unbalanced surfaces were used in the elevator control the pilot was able to feelingly realize and judge by the reaction of the control column upon his hand and arm the relative air speed of the aeroplane in flight, and he would feelingly limit the acceleration of his machine to an appropriate extent, commensurate to the strength and the structural characteristics of his machine.

Since in more recent time, because of the higher powered motors and higher speeds used in aeroplanes—the control surfaces including the elevator control had to be provided with balancing expedients, viz. in view of the limited physical strength of the pilot, the latter has lost the aforesaid feeling for the air speed and accordingly the danger has arisen, that the machine is accidentally subjected to excessive acceleration and overstraining.

Many of those accidents and casualties unaccounted for up to the present, which were accompanied by breaking of the wings, the sudden destruction of the aeroplanes and the loss of many lives must be justly attributed to accidental overstraining of the vital structural elements of the aeroplanes concerned through undue acceleration and excessive stresses.

Various appliances have been designed and proposed for eliminating or reducing the danger accruing from too suddenly righting aeroplanes. For instance braking vanes have been designed, which are thrust out of the body or wings etc. of the plane, or are to be turned into a position opposed to the air flow, so as to prevent an excessive acceleration of the aeroplane and to thus artificially reduce to a tolerable degree the stresses upon its structure.

Obviously contrivances of that character are of little avail with modern aeroplanes, of which extremely high speed—400-500 km. per hour and more—is a predominant feature.

It has also been proposed to provide the control column proper or other parts of the control mechanism concerned with damping devices such as braking vanes and like members, which are exposed to the air flow, in order to counterbalance the physical force applied by the pilot to the control column, so as to limit or impair the movements of the latter.

However, appliances of that type are of little use in practice because aeroplanes provided therewith would be unable to zoom or jump over dangerous zones and obstructions suddenly arising such as high trees, observation towers, long distance lines, hills, etc.; moreover those appliances are unsafe and subject to failure because being dependent upon the physical strength of the pilot, which naturally differs with different individuals.

Another apparently simple way to make flying safer and to avoid the dangers described would be to structurally strengthen the skeleton, framings, body, wings of aeroplanes to such an extent, viz. by using heavier girders, struts, bracings, king-posts etc., that the aeroplane would safely resist the maximum stresses possibly occurring in flight.

Obviously aeroplanes constructed so sturdily would be much too heavy for practical purposes and are likely not to rise into the air at all, or could carry no useful load.

The principal object of this invention is to overcome the drawbacks inherent to the aforesaid safety appliances, equipments and expedients,—by providing a self-acting safety device of simple design, which can be easily associated structurally with the elevator control of aeroplanes of all types, and which will automatically prevent excessive accelerations of the latter.

An important feature of the safety device concerned consists therein, that it is designed to react upon the elevator independently of the individual physical strength of the pilot, namely of his greater or smaller muscular energy, in such manner, that accidental deflections, likely to be imparted to the elevator through pilots' errors and mismanagement, which would be excessive, untimely and dangerous as to the angle of deflection or as to the angular speed of deflection of the elevator control-surfaces during a dive of the aeroplane and the following righting operation are automatically compensated or reduced to a safe limit.

Another important function of the safety device designed according to this invention consists therein, that it will not only respond to the relative air speed—as in the case of some of the appliances used in bygone times and referred to above, but will also do its work in response to undue namely excessive, deflections of the elevator surfaces, so as to directly or indirectly readjust the acceleration of the plane.

Another outstanding feature of the safety device designed according to this invention consists in the absence of auxiliary fins, vanes and like wind actuated controlling members, which would impair the manoeuvrability of the aeroplane, the object being to maintain the speed of advance and of climb to its full extent, as will be shown and explained hereinafter with reference to the diagrams in Fig. 8.

Further objects of the invention and advantages obtained will become apparent hereinafter to pilots and designers of aeroplanes.

The nature and scope of the invention are briefly outlined in the appended claims and will be more fully understood from the following specification taken together with the accompanying drawings, in which Figs. 1-3 are lay-outs, diagrammatically showing different ways, in which safety devices according to this invention of the type shown in Figs. 5 and 6 can be conveniently cooperatively connected with appropriate parts of the elevator control mechanism,—its column, control wheel, connecting rods, cables etc.

Fig. 4 is a side elevation showing by way of an example, how the elevator control mechanism may be conveniently geared with a structurally modified safety device according to this invention shown in Figs. 11-12;

Fig. 4a is a plan showing the elevator control surfaces of an aeroplane designed and actuated by a safety device according to this invention, viz. of the modified design shown in Figs. 11 and 12;

Fig. 5 is a section through a safety device according to this invention;

Fig. 5a is a cross section taken on line V—V through the device shown in Fig. 5, and seen in the direction of the arrows;

Fig. 6 is a structurally modified safety device of the type shown in Figs. 5 and 5a;

Fig. 7 diagrammatically shows the working of differently loaded springs, as used in connection with safety devices according to this invention,—namely the travel of said springs caused by different forces acting thereupon in practice;

Fig. 8 is another set of diagrams showing the working of the improved safety devices concerned with reference to the acceleration of the aeroplane occurring at different rates of speed;

Fig. 9 is a set of diagrams, elucidating the different accelerations, which are successively imparted to characteristic points of the aeroplane, its center of gravity, its wings and tail,—the diagrams have been computed from measurements taken while the aeroplane flew at a speed of about 150 km. per hour; the elevator control surface was then deflected rather abruptly through a substantial angle, viz. within about one tenth of a second;

Fig. 10 is another set of diagrams showing the same factors as Fig. 9, but under different conditions, viz. when the speed of the aeroplane was about 290 km. per hour and the elevator control surfaces were deflected within a still shorter period of time, ranging below one fifteenth of a second;

Fig. 11 diagrammatically shows an inertia controlled safety device according to this invention, referred to above in connection with Figs. 4 and 4a;

Fig. 12 is a side elevation diagrammatically showing an aeroplane equipped with an inertia controlled safety device of the design shown in Fig. 11;

Fig. 13 is a side elevation showing another inertia controlled safety device designed according to this invention.

Briefly stated the invention consists in cooperatively connecting the elevator of the aeroplane with a safety device having yielding elements, which are adapted to automatically stop or readjust the working of the elevator control mechanism so as to reduce the righting effect of the elevator to a warranted extent, consistent with the structural and aerodynamic characteristics of the individual aeroplane, viz. in response to excessive air forces acting upon the elevator control surfaces and (or) to excessive and untimely deflections of the latter and (or) to excessive accelerations and retardations, accidentally imparted to the aeroplane in flight through mismanagement, violent gusts of wind or other causes.

In the embodiment of the invention shown by way of an example in Figs. 5 and 5a of the drawings the safety device comprises:

(1) A cylinder 2 closed at one end by a detachable lid 2a, which is provided with a shank 3; lugs 7a, 7c being formed on said cylinder and its lid respectively, (2) A piston 4 attached to a rod 5 and slidingly fitting in said cylinder, (3) A yoke 6 having arms 6d projecting therefrom, which snugly fit between the said lugs 7c, 7a over the cylinder 2; said yoke is secured to rod 5 and formed with lugs 6a, 6c;

(4) A spring 9 snugly fitting over the arms of said yoke, (5) A bolt 8 tapering towards both ends, which, secured within cylinder 2, snugly fits into a hole provided in piston 4; the cylinder 2 is filled with a fluid, preferably glycerin, before the device is inserted in the manner indicated by way of examples in Figs. 1-3 into the train of members, through which the movements of the elevator are controlled by the pilot.

In Figs. 1-3 the safety device is diagrammatically indicated at $i$; the said train of members appertaining to the elevator control comprising hand wheel 20, column 21, fulcrumed at 22, struts 23, 23a and connecting rods 24.

The device shown in Fig. 5 is fitted in the elevator control mechanism of an aeroplane preferably in such manner, that the spring 9 is under initial load and will not yield until the forces acting upon the shank 3 and rod 5 exceed a predetermined value.

A special feature of the safety device shown in Fig. 5 consists therein, that, when in action, the glycerin within cylinder 2 must be forced through a narrow annular gap in the hole of piston 4, thus acting as a powerful braking or damping medium, which complements and enhances the action of the spring 9.

By reason of the tapering or conical shape of bolt 8 the damping effect decreases proportionately to the growing compression of spring 9. The dotted lines in Fig. 5 indicate, that the bolt 8 may be conveniently formed cylindrically, viz. in cases, where it is preferred to keep the damping effect of the glycerin-filling constant.

The device shown in Fig. 5 may be further conveniently modified structurally by omission of the bolt 8 and the glycerin filling of cylinder 2 altogether.

Another structurally modified safety device, designed according to this invention and shown in Fig. 6, comprises: (1) A cylindrical casing 10, closed at both ends by detachable lids 10a, and 10c; lid 10c being formed with a shank 11; another shank 12a is secured to a stepped disk 12, which snugly fits into a hole of lid 10a and engages the latter; (2) a rod preferably consisting of two pieces 13 and 13a, the latter being formed with a stepped disk adapted to bear against rib 10d; said rod 13, 13a is guided in holes provided in the shanks 11, 12 and capable of slidingly moving to and fro within casing 10; (3) two springs 14 and 15, which surround said rod and are arranged in series thereon so as to bear against the lids 10a, 10c and the shanks 11, 12 respectively.

Both said springs are in loaded condition that is under compression; the load on spring 15 being larger than that upon spring 14, whereas the working characteristic, that is the diagram 14 showing the travel of spring 14 in proportion to the load acting thereupon, is preferably a rather steeply ascending line, steeper than that of spring 15.

The initial loads of both springs should be so determined, that the safety device does not yieldingly work as long as the air forces acting upon the elevator control mechanism are within the limits of safety; on starting to work in response to excessive stresses transmitted through the elevator control mechanism spring 14 is first compressed until its load equals that of the initial tension of spring 15, whereafter the latter is in turn compressed.

The working characteristics of the safety device shown in Fig. 6 may be conveniently modified by structurally associating it with liquid damping means of the type shown and described in connection with Fig. 5 or with analogous means.

Fig. 7 diagrammatically shows the working characteristics of springs, as used in connection with safety devices according to this invention,— namely the travel of said springs caused by different forces acting thereupon.

In Fig. 7 the ordinates designate the forces acting upon the springs concerned, while the abscissas are the respective travels of the springs.

Diagram line $a$ shows the course of action of a spring, which is not under initial load; the curved diagram line $a2$ shows the course of action of the same spring cooperatively associated with a damping device, or with a gearing up and down mechanism for instance a system of levers; diagram line $b$ shows the conduct of safety device according to this invention, the spring of which is under the initial load $f$, while the curved line $b2$ shows the action of the same device complemented by damping means, as shown in Fig. 5; diagram lines $c$—$c2$ elucidate the course of action of a structurally modified safety device of the type shown in Fig. 6, having two springs 14, 15, which are under different initial load $f2, f3$, spring 15 starting to work at $t3$.

In Fig. 8 the ordinates designate the acceleration of a vital part of an aeroplane for instance of its wings, while the abscissas are the velocities, for which the aeroplane is built, and which can be safely obtained.

Diagram line $g$ shows the acceleration of an aeroplane in flight, which is not provided with a safety device according to this invention, on gaining speed, while diagram line $h$ shows the highest permissible acceleration, and line $k$ the maximum speed, for which the aeroplane is built.

There are all the accelerations and speed permissible for the aeroplane concerned within the cross hatched field of Fig. 8; diagram line $a3$, which may be appropriately compared with line $a$ of Fig. 7, shows, that the range of action of a safety device having a spring, which is not under initial load, is rather small, which means, that the manoeuvrability of the aeroplane would be seriously impaired.

By using a spring which is not under initial load, but is complemented in its action by appropriate damping means, the range of action of a safety device provided therewith would be slightly larger, as seen from the curved line $a4$, comparable to line $a2$ of Fig. 7;—diagram line $b3$ comparable to line $b$ in Fig. 7 elucidates the fact, that a safety device provided with a spring under initial load has a still larger range of action; the diagram lines $b4$, $c3$ and $c4$ show, that the range of action of safety devices according to this invention is still more enlarged by using either one spring, which is under initial load and cooperatively associated with damping means or by providing two springs, which are under different initial loads, as described with reference to the safety device shown in Fig. 6; the latter will start working after the aeroplane has attained a speed indicated at $k1$.

Various other modifications and changes may be conveniently made in structural details of safety devices of the improved design described above, and in the cooperation of their intrinsic parts with the elevator control of aeroplanes,— without substantially departing from the spirit and the salient ideas of this invention.

Whereas the safety devices shown in Figs. 5 and 6 are designed so as to directly cooperate with the elevator control mechanism, viz. being responsive to excessive forces transmitted therethrough, the safety device shown in Figs. 11 and 12 is designed so as to indirectly react upon the elevator, viz. being responsive to excessive acceleration of an intrinsic part of the aeroplane, for instance of its tail.

The reader will be able to more fully understand the structural and functional characteristics of the safety device, shown in Figs. 11 and 12 and described hereinafter also with reference to Figs. 4 and 4a, by first studying the diagrams shown in Figs. 9 and 10, which are based on similar diagrams published in the NACA Report 364 by R. V. Rohde.

In both sets of diagrams the time in seconds is marked along the abscissa, while with the ordinate go:

$m$=deflection of the elevator,
$n$=acceleration—namely $n2$=wings, $n3$=center of gravity of the aeroplane, $n4$=tail.
$o$=angular velocity of the aeroplane, and
$p$=angular acceleration of the latter.

In both figures the scales used for showing the growth and fading of the various factors are identical;—the diagrams of Fig. 9 were computed from measurements taken, while the aeroplane tested flew at about 150 km. per hour, whereas in Fig. 10 its speed was about 290 km. per hour.

As seen from the diagram line $m$ the elevator control surfaces were deflected in both cases through about the same angle but within different periods of time: In the case of Fig. 9 the said surfaces were wholly deflected within about one tenth of a second, while with Fig. 10 the deflection was accomplished within about one fifteenth of a second.

On studying diagram lines n in Fig. 10 the reader will realize, that the accelerations of the various parts of the aeroplane in flight culminate much higher, than in the case of Fig. 9, and that the maximum acceleration occurs not until nearly one second has passed; this means, that the aeroplane has flown in the meantime through a distance of more than 100 meters, and that at the time the maximum acceleration is attained, it would be too late for correcting the deflection of the elevator surface.

Diagram line n4 in Fig. 10 reveals the remarkable fact, that the tail of the aeroplane is at first downwardly accelerated,—namely almost concurrently with the deflection m of the elevator control surface.

Diagram line p in Fig. 10 reveals another important fact, viz. that the angular acceleration p of the aeroplane increases much quicker and attains its maximum value long before the wings n2 have been fully accelerated.

In recognition of the above described facts another safety device having also a yielding element has been designed by the inventor and is disclosed hereinafter; said safety device which is diagrammatically shown in Fig. 11 and is designated i2 in Fig. 12 comprises:

(1) Springs 30, 30' arranged in opposed position to each other within a casing 32.

(2) A mass 31 formed with a thumb projecting therefrom and being designed to actuate an electric relay; said mass is slidingly mounted within casing 32 and resiliently supported by the said springs 30, 30';

(3) The electric relay comprises: a sliding contact member 33, attached to said thumb and being connected with one of the terminals of a source of electricity 34; another sliding contact member in the form of a bushing 35 is also attached to said thumb, which is connected with the other terminal concerned; a rheostat comprising two resistances 41, 41' designed for cooperation with the contact member 33 and being spaced from each other by an insulator 42; said rheostat is connected by lines 44, 45 with the terminals of an electromotor 40; contact bridges 43, 43' designed for cooperation with said bushing 35 and being also connected by lines 44', 45' with the terminals of said motor.

The safety device described with reference to Fig. 11 is preferably arranged in the tail of the aeroplane; as seen in Fig. 12 illustrating the righting of a descending aeroplane the mass 31 tends to move in the direction of arrow r2, while the aeroplane follows a new course along arrow r; in consequence of the displacement of mass 31 through its inertia and contact member 33 is lowered and thus electric current is supplied to the electric motor 40, which will then rotate say in clockwise direction and will thus counteract and correct an undue acceleration of the aeroplane.

In cases, where the tail of the aeroplane is downwardly accelerated the mass 31 by its inertia is upwardly displaced with the result, that the electric motor 40 will revolve in anticlockwise direction and thus overcome an undue acceleration of the aeroplane.

It will be noted from Fig. 11, that the more the aeroplane is unduly accelerated in the direction of arrow r2 the more the resistance 41 is short circuited with the result, that the motor 40 rotates more rapidly and makes necessary corrections within a shorter period of time.

In Fig. 4 gearings and power transmission members are diagrammatically shown by way of example, by which the electromotor is cooperatively connected with the elevator control; said members comprising a pulley engaged by a rope 50, which is driven by the electric motor concerned, and a rack and pinion gear 51, 52 designed to actuate an auxiliary elevator control surface 60.

As indicated by arrows in Fig. 4 the said control surface 60 is downwardly deflected in the event of the aeroplane being unduly accelerated during the righting operation and thus counteracts an excessive deflection of the main elevator.

Fig. 4a diagrammatically shows by way of another example, how auxiliary control surfaces 61 provided for the purpose described are arranged between the elevators 62, and how both surfaces are cooperatively connected with their respective actuating members 61', 62'.

Instead of a mass 31 yieldingly arranged in the tail of the aeroplane and being designed to slide up and down within a straight casing 32 by reason of its inertia so as to actuate a relay, as shown in Figs. 11 and 12,—a rotary mass diagrammatically indicated at 50 in Fig. 13 and being comparable in its action to a fly-wheel may be used to advantage, which is resiliently engaged by a spiral spring (not shown) and arranged in the center of gravity of the aeroplane.

I am aware, that it has become known in the art—for instance from United States Patent 1,729,210 to Delage—to provide aircraft heavier than air with a safety type of wings, the surfaces of which being structurally subdivided and comprising a front part and a rear part, which are angularly moveable to each other and resiliently interconnected, so that the wing profile of normal flight is automatically modified, when the stresses upon the wing during a dive and at a sudden righting operation exceed a predetermined value,—the ultimate object being to prevent or counterbalance an excessive migration of the center of thrust from the front half to the rear half of the profile of the wings; and I make no claim for wings in aeroplanes subdivided for reasons of safety, nor for the application of resilient members, dashpots and balance weights in the control surfaces of aeroplanes in general.

What I claim is:—

1. In an aeroplane, an elevator, a mechanism under the pilot's control for operating said elevator, and self-acting means for adjusting the righting effect of the elevator in response to excessive accelerations and retardations of the aeroplane, said adjusting means comprising an auxiliary surface associated with the elevator, and inertia controlled means for indirectly actuating said auxiliary surface.

2. In an aeroplane, an elevator, a mechanism under the pilot's control for operating said elevator, and self-acting means for adjusting the righting effect of the elevator, in response to excessive accelerations and retardations of the aeroplane, said adjusting means comprisng an auxiliary surface associated with the elevator, and inertia controlled means for actuating said auxiliary surface,—said actuating means comprising an electric servomotor geared with said auxiliary surface, an electric circuit, and an inertia controlled relay for connecting said electric circuit and servomotor.

3. In an aeroplane, an elevator, a mechanism under the pilot's control for operating said elevator, and self-acting means for adjusting the righting effect of the elevator, in response to excessive accelerations and retardations of the aeroplane, said adjusting means comprising an auxiliary surface associated with the elevator, and inertia controlled means for actuating said auxiliary surface, said means comprising an electric servomotor geared with said auxiliary surface, an electric circuit and an inertia controlled relay for connecting said electric circuit and servomotor,—said relay being provided with a resiliently suspended mass adapted to perform reciprocating movements.

4. Anti-stalling device for aeroplanes comprising the combination with an elevator of an elevator control column, a train of connecting members cooperatively interconnecting said control column and elevator, and a resilient power transmission member inserted in said train of connecting members for yieldingly preventing excessive deflections of the elevator,—said power transmission member comprising two helical springs arranged in series to each other and having different working characteristics, and a casing enclosing said springs and keeping the latter under initial tension.

5. Anti-stalling device for aeroplanes comprising the combination with an elevator of an elevator control column, a train of connecting members cooperatively interconnecting said control column and elevator, a resilient power transmission member inserted in said train of connecting members for yieldingly preventing excessive deflections of the elevator,—and damping means cooperatively associated with said resilient power transmission member.

6. Anti-stalling device for aeroplanes comprising the combination with an elevator of an elevator control column, a train of connecting members cooperatively interconnecting said control column and elevator, a resilient power transmission member inserted in said train of connecting members for yieldingly preventing excessive deflections of the elevator, and damping means cooperatively associated with said resilient power transmission member,—said damping means comprising a cylinder filled with a fluid, a piston slidably mounted therein, and being formed with a hole for the passage of the fluid, and a bolt tapering towards both ends, and snugly fitting into said hole.

KARL SCHWÄRZLER.